Dec. 25, 1923. 1,478,610

H. P. KRAFT

DEFLATING VALVE CAP

Filed Oct. 19, 1922

INVENTOR
Henry Phillip Kraft,
By Attorneys,

Patented Dec. 25, 1923.

1,478,610

UNITED STATES PATENT OFFICE.

HENRY PHILLIP KRAFT, OF RIDGEWOOD, NEW JERSEY.

DEFLATING VALVE CAP.

Application filed October 19, 1922. Serial No. 595,659.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Deflating Valve Caps, of which the following is a specification.

This invention relates to a valve cap for a pneumatic tire or other valve, which is so constructed as to act also as a deflator for the valve.

According to the present invention I provide a cap of the standard type in which the screw driver extension is formed with an abutment to engage the valve pin, and also carries with it a screw-threaded sleeve which is rotative relatively to the projection and longitudinally slidable thereon. By this means when the sleeve is screwed on the valve, it forces the screw driver projection down into deflating position. On the other hand, when the cap is to be used as a screw driver, the sleeve slides back out of the way so that it does not interfere with the screwing or unscrewing operation. The construction is such that the sleeve is formed with an external thread which engages the internal thread of the valve nipple, so that the device is nearly as compact as the standard cap, and has substantially the same appearance.

In the drawings which show one form of the invention:

Figure 1:
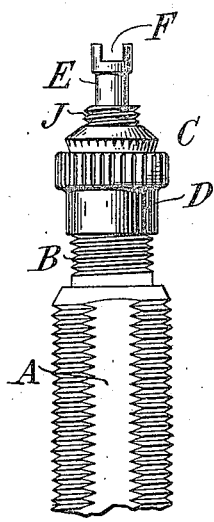
Figure 1 is an elevation of the upper end of the valve showing the device used as a valve cap.

Referring to the drawings, let A indicate a standard valve having a nipple B. C is a valve cap provided by the invention which has the usual screw-threaded base D and a screw driver projection E having a slot F formed in its end for engagement wtih the inside working parts G of the valve.

Figure 3:
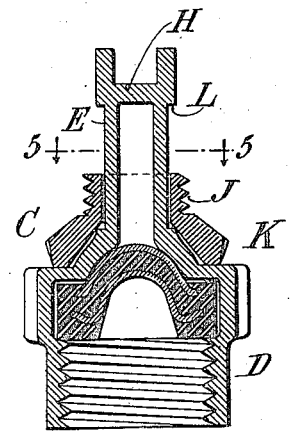
Fig. 3 is an enlarged diametrical section.
Figure 4:
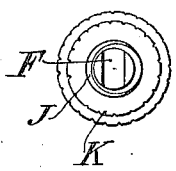
Fig. 4 is a plan of Figure 1.

Referring to Fig. 3 it will be seen that an abutment H is provided within the open end of the screw driver projection, which abutment is adapted to engage the deflating pin I of the valve insides. Surrounding the screw driver projection is a sleeve J which is screw-threaded on its exterior portion so that it is adapted to engage the interior thread of the valve nipple. Preferably the sleeve has an enlarged flange K which adapts it to be more conveniently grasped by the fingers. The sleeve J slides along the screw driver projection, the latter having preferably a shoulder, or some other form of stop, L which prevents separation of the parts. The sleeve is also capable of rotating movement with relation to the screw driver projection so that it may be manipulated without rotating the cap; conversely, the cap may be rotated without rotating the sleeve.

Figure 2:
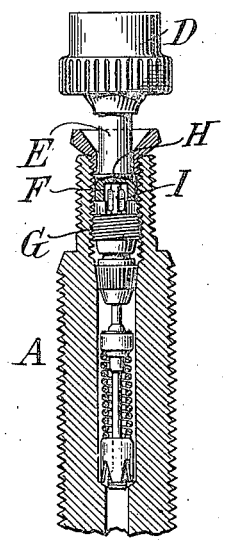
Fig. 2 is a diametrical section showing the device used as a deflator.

The result of this construction is that when the device is applied as shown in Fig. 2, the sleeve may be rotated without any possibility of disturbance of the valve insides, while when the cap is used as a screw driver, there is no difficulty occasioned by the sleeve engaging the thread of the nipple, since if it does it will not interfere with screwing the valve insides home or the removal of the screw driver without again unscrewing the insides.

Figure 6:
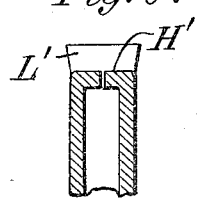
Fig. 6 is a view of a modified form of the screw driver projection.
Figure 5:
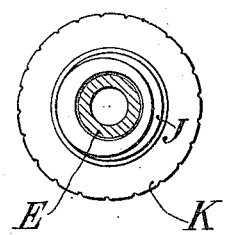
Fig. 5 is a section on the line 5—5 in Fig. 3.

The sleeve may take different forms as may also the screw driver projection. In Fig. 6 I have illustrated, for instance, the abutment H' formed by turning in the tongues of metal left when the screw driver slot is cut. The end of the screw driver projection may be flared outwardly slightly, as illustrated, to form the stop L' for the sleeve J.

Other changes may be made without departing from the spirit of the invention.

What I claim is:

1. A device of the character described, comprising a member having a screw driver projection having an abutment adapted to contact with the end of the valve pin, and a sleeve rotatively and slidably mounted on said projection, said sleeve having means for engaging the interior of the valve casing and holding the projection with its abutment in contact with the valve pin.

2. A device of the character described, comprising a member having a screw driver projection having an abutment adapted to contact with the end of the valve pin, and a sleeve rotatively and slidably mounted on said projection, said sleeve having means for engaging the interior of the valve casing and holding the projection with its abutment in contact with the valve pin, and said sleeve having a manipulating flange.

3. A combined valve cap and deflator comprising a cap portion having a screw driver projection, an abutment in said projection below the screw driver, a sleeve slidably and rotatively mounted on said projection, and having an external thread adapted to engage the internal thread of the valve casing to hold the cap and said abutment on the pin of the valve.

4. A combined valve cap and deflator comprising a cap portion having a screw driver projection, an abutment in said projection below the screw driver, a sleeve slidably and rotatively mounted on said projection, and having an external thread adapted to engage the internal thread of the valve casing to hold the cap and said abutment on the pin of the valve, and said sleeve having a manipulating portion.

5. A device of the character described comprising a valve cap having an abutment, a member slidably and rotatively mounted on said valve cap and having means to engage the interior valve casing to hold said abutment in contact with the valve pin.

6. A combined valve cap and deflator comprising a cap portion having a screw driver projection, a sleeve slidably and rotatably mounted on said projection and having an external thread adapted to engage the internal thread of the valve casing to hold the cap and said abutment on the pin of the valve, and said sleeve having a dished or tapered manipulating flange.

In witness whereof, I have hereunto signed my name.

HENRY PHILLIP KRAFT.